W. E. EASTMAN.
SPRING SUSPENSION FOR VEHICLES.
APPLICATION FILED JULY 14, 1910.
1,007,077.
Patented Oct. 31, 1911.
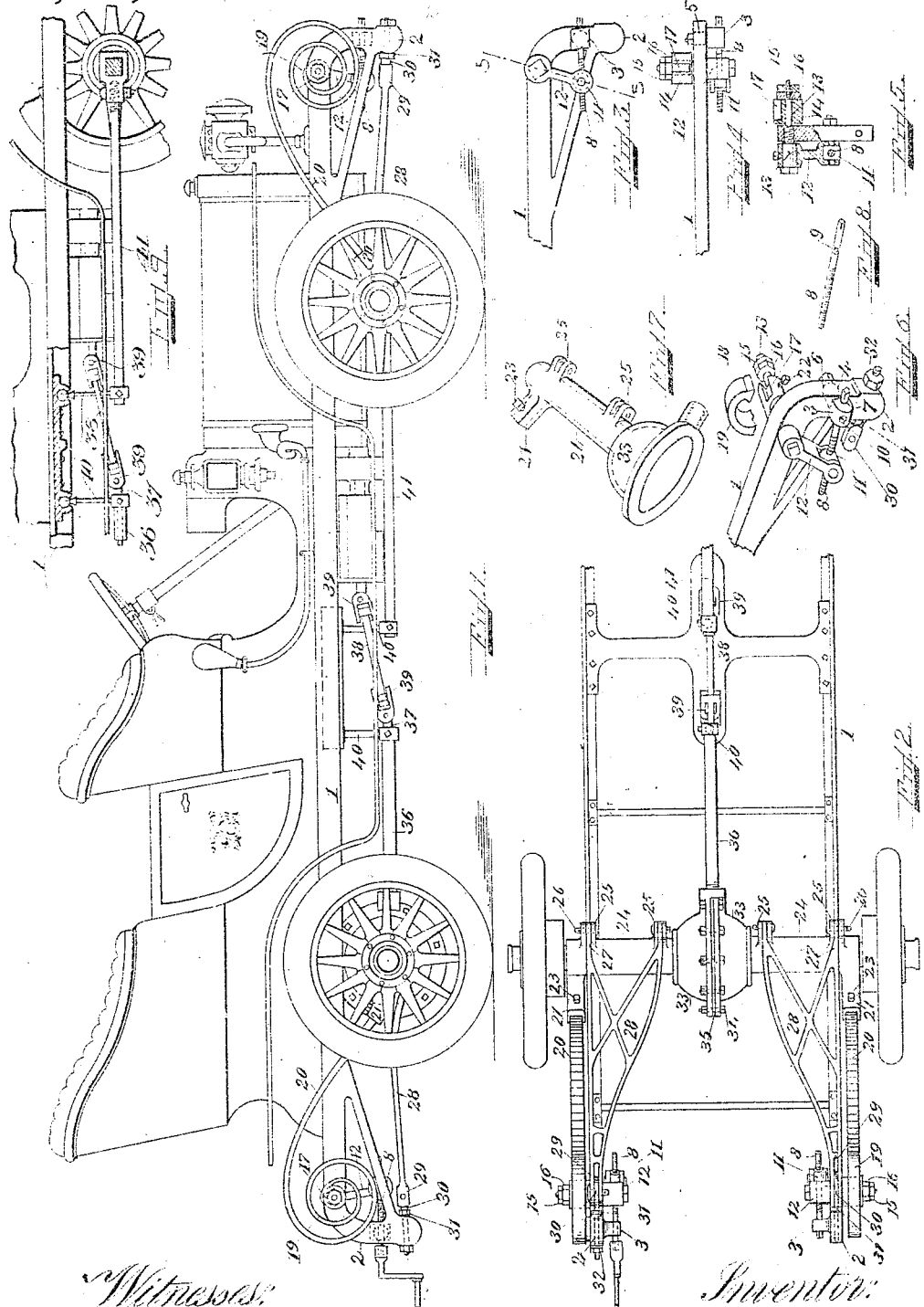

UNITED STATES PATENT OFFICE.

WILLIAM EVERARD EASTMAN, OF BOSTON, MASSACHUSETTS.

SPRING SUSPENSION FOR VEHICLES.

1,007,077.

Specification of Letters Patent. Patented Oct. 31, 1911.

Application filed July 14, 1910. Serial No. 572,053.

*To all whom it may concern:*

Be it known that I, WILLIAM E. EASTMAN, a citizen of the United States, and a resident of Boston, in the county of Suffolk and State of Massachusetts, have invented certain new and useful Improvements in Spring Suspensions for Vehicles, of which the following is a specification.

My invention relates to improvements in spring suspension for vehicles, and it particularly applies to the support of the vehicle body under minimum and maximum loads.

The purposes of my improvements are, first, to provide means to actuate the springs to sustain equipollently any imposed weight not exceeding the structural capacity; second, to secure by said means a stable equilibrium of the carriage body; third, to secure an extended frame supporting base without changing the position of the axles; fourth, to obviate any semi-rotative action of the axle casing and in other specific combinations and arrangement of parts herein-after described and defined in the claims.

My improved construction is further explained through reference to the annexed drawing forming a part of this specification, in which:

Figure 1, is a side elevation of a gear driven vehicle embodying my improvements. Fig. 2, denotes a plan of the rearward and underside portion of the frame adjacent to the rear axle. Fig. 3, is an elevation of the interior side of the end of the frame with its bracket. Fig. 4, designates a plan of the same. Fig. 5, is a transverse section on broken line 5—5 of Fig. 3. Fig. 6, exhibits in perspective the features shown in Figs. 3, 4 and 5. Fig. 7, denotes a perspective of the rear axle sleeve or casing. Fig. 8, is a like view of the adjusting bolt. Fig. 9, is a fragmentary part of Fig. 1 partially in section disclosing the bar anchorages to the fore axle, and the attaching knuckle joints of the standards.

Corresponding characters designate similar features throughout the several views, referring to which—

1, denotes the vehicle frame, and 2 the integral dropped brackets forming the terminals thereof. Said brackets 2 are each provided with a turn block 3, its supporting journal 4 having a screw threaded bearing 5 (Fig. 4) of lesser circumference to form an annular shoulder for the nut 6 as it is turned up there against when finally positioned on the inner face of the bracket 2, thus permitting a slight circumferential unrestricted movement of the block 3. Said block has, further, a circular opening 7 diametrically which receives the screw threaded adjusting bolt 8 provided with a circumferential slot 9 positioned centrally in the block 3 on the assemblage of the devices, and therein revolubly confined by the set screw 10. The screw threaded end of said bolt 8 engages with the semi-rotatable block 11 mounted in the bifurcated oscillating pendent lever 12 movably attached to the frame 1 by the triple shouldered journal bolt 13 screw engaged with said frame, and passing therethrough to provide a bearing from its second shoulder to receive the spring anchor block 14 which is confined thereon by the primary and secondary nuts 15—16. Said block 14 is provided with a longitudinal groove 17, internally flaring and approximately its length, the groove being open at the end remote from the outer side of the frame for the purpose of receiving the wedge block 18, forming an integral end of the spiral spring 19 which, after seating in the anchor block 14 is retained by the nuts 15—16 as previously stated, while the set bolt 22 secures the block from axial rotation on its bearing. The above described elements are for the purpose of securing and renewing the resiliency of the elastic elements supporting the carriage body.

The spring extension 20 is supported in the socketed arm 21 of the axle casing 24, and therein confined by the set bolt 23 (Fig. 2). Said axle casing 24 (Fig. 7) is cast in duplicate, or may be in one piece with suitable provision for access. Said casing is provided with lugs 25 extending from the side opposite said arm 21 and pierced to receive and secure by cotter pins 26, the inward ends 27 of the triangular brace frames 28. The outward end 29 is biforked to receive the screw threaded clip 30 having a shoulder 31 which abuts against the inside of the frame bracket 2, and is screw engaged therewith and secured by nuts 32. The purpose of said brace frames 28 is to impart stability to the axles and to restrain their tendency to horizontal and transverse motion thereby lessening the friction of the correlative parts, and avoiding the employment of radial rods. A housing 33 integral with said casing 24 incloses the rear axle driving gears, the sections being united by a series of draw bolts 34 compressing the gasket 35 so as to form a dust excluding cover for the gearing. A rod 36 is screw engaged to said housing 33 and may form a sleeve for the gear shaft 37 united to the transmission shaft 38 by universal sliding joints 39, the end of said rod 36 adjacent the center of the vehicle body being suspended by the movable depnding standard 40 secured by knuckle joint to the frame. A correspondingly suspended rod or tubing 41 forwardly connects with the fore axle to hold the same in alinement with the rear axle, the rod 36 contributing to the stability of the rear axle equipment said rods' unitedly retaining both axles at right angles with the frame and through the standards forming a union therewith.

The manner of recuperating the exhausted tension of my improved frame spring is as follows: To the head of the adjusting bolt 8 is applied a suitable wrench (Fig. 1) rotating the bolt slightly, thus oscillating the lever 12 through its turn block 11, which actuates the block 14 in a manner to expand the spiral 19 thus renewing the resiliency of the springs to support the carriage body with substantially an equal resistance for minimum and maximum weight to be carried.

Minor changes obviously may be made in the precise details of construction and exact arrangements of parts of my improved invention, I therefore desire not to restrict myself to the specific embodiments herein shown for the purpose of illustration, and

I claim—

1. In an improved spring suspension for vehicles a body supporting frame having reflexed terminals at the ends thereof, turn blocks movably supported therein and provided with an adjusting screw bolt, a semi-rotatable block mounted on said bolt, a pendant lever connected to said rotatable block and means actuated by the lever to removably retain the outward ends of said spring suspension.

2. In an improved elastic suspension for vehicles a supporting frame having contiguous to the ends thereof attached oscillatory levers, shouldered journals upholding said levers, a spring anchor block thereon supported and having means for the temporary retainment of the elastic elements and means attached to said frame to actuate said levers in a manner to increase or diminish the tension of the elastic members to sustain minimum and maximum imposed weight with an equal resisting force.

3. In elastic supports for a vehicle body the combination with a frame having integral brackets of turn blocks mounted therein, screw engaged adjusting bolts movably retained in said blocks, semi-rotatable members engaging said bolts, oscillatory pendant levers thereto attached and provided with means for the impermanent confinement of the spirals and means for the temporary anchorage of the elastic support extensions to the axle sleeves.

4. In an improved vehicle body supporting frame a series of elastic elements comprising spirals having integral wedge blocks, anchor blocks provided with means for impermanent reception of said wedge blocks, pendant levers actuating the anchor blocks and means upheld by the frame brackets to operate said levers in a manner to increase the tension of said elastic elements.

5. The combination with the frame of elastic supports for a vehicle body having terminals adapted to engage with tension restoring devices comprising spring anchor blocks provided with grooves, triple shouldered journal bolts forming axial bearings for said blocks, oscillating levers depending therefrom and means secured to the frame brackets to control said levers to increase the tension of said elastic supports.

6. In an elastically suspended vehicle body frame the combination with brace rods having means for their engagement with said frame, axle sleeves provided with lugs for their engagement with said brace rods, of a rod communicating with said sleeves and having a movable support at its opposite end and means connecting said support with said frame.

7. In an elastically suspended vehicle body frame the combination with triangular brace rods having means for their attachment to said frame and to the axle sleeve, of a rod attached to and extending from the fore axle rearwardly, a movable standard suspending said rod and means supporting the standard to the vehicle frame.

In testimony whereof I have affixed my signature, in presence of two witnesses.

WM. EVERARD EASTMAN.

Witnesses:
 CHARLES B. SPENCER,
 GEO. W. CAULKINS.